US009751286B2

(12) United States Patent
Yoda et al.

(10) Patent No.: US 9,751,286 B2
(45) Date of Patent: Sep. 5, 2017

(54) WEATHER-RESISTANT MULTILAYER FILM

(75) Inventors: Akiko Yoda, Chiba (JP); Kenya Ito, Chiba (JP); Koji Ohguma, Chiba (JP); Mikio Yamahiro, Chiba (JP)

(73) Assignee: JNC CORPORATION, Tokyo (JP)

(*) Notice: Subject to any disclaimer, the term of this patent is extended or adjusted under 35 U.S.C. 154(b) by 82 days.

(21) Appl. No.: 14/129,990

(22) PCT Filed: Jul. 2, 2012

(86) PCT No.: PCT/JP2012/066856
§ 371 (c)(1),
(2), (4) Date: Dec. 30, 2013

(87) PCT Pub. No.: WO2013/002406
PCT Pub. Date: Jan. 3, 2013

(65) Prior Publication Data
US 2014/0141223 A1 May 22, 2014

(30) Foreign Application Priority Data

Jun. 30, 2011 (JP) ................................ 2011-146758

(51) Int. Cl.
*B32B 27/18* (2006.01)
*B32B 27/30* (2006.01)
(Continued)

(52) U.S. Cl.
CPC .............. *B32B 27/18* (2013.01); *B32B 27/08* (2013.01); *B32B 27/308* (2013.01); *B32B 27/36* (2013.01);
(Continued)

(58) Field of Classification Search
None
See application file for complete search history.

(56) References Cited

U.S. PATENT DOCUMENTS 5,061,558 A * 10/1991 Fischer ................... B32B 27/18
264/176.1
5,200,468 A * 4/1993 Pickton ......................... 525/183
(Continued)

FOREIGN PATENT DOCUMENTS

CN 101365587 2/2009
JP 07-137210 5/1995
(Continued)

OTHER PUBLICATIONS

Machine translation of JP 2002/166502 A; obtained from Industrial Digital Property Library of the JPO on Apr. 16, 2017.*
(Continued)

*Primary Examiner* — Aaron Austin
*Assistant Examiner* — Zheren J Yang
(74) *Attorney, Agent, or Firm* — Jianq Chyun IP Office

(57) ABSTRACT

Provided is a multi-layered weather-resistant multilayer film that exhibits good substrate adhesion, wherein curing problems are avoided, bleed-out is minimized, yellowing is reduced, and weather-resistance is improved. The weather-resistant multilayer film 10 is provided with the following: a transparent film-like substrate C; a UV-absorbing resin layer B laminated on the substrate C and containing a UV absorber; and a first cured resin layer A laminated on the UV-absorbing resin layer B. The first cured resin layer A has a thickness of 1.0 to 10 μm. The UV-absorbing resin layer B has a thickness of 0.5 to 5 μm. The UV-absorbing resin layer B has an absorption wavelength of 200 to 500 nm.

5 Claims, 3 Drawing Sheets

(51) Int. Cl.
  *B32B 27/08* (2006.01)
  *B32B 27/36* (2006.01)

(52) U.S. Cl.
  CPC ....... *B32B 2307/40* (2013.01); *B32B 2307/71* (2013.01); *B32B 2307/712* (2013.01); *B32B 2457/20* (2013.01); *Y10T 428/24975* (2015.01); *Y10T 428/31797* (2015.04); *Y10T 428/31928* (2015.04)

(56) References Cited

U.S. PATENT DOCUMENTS

| | | | | |
|---|---|---|---|---|
| 5,268,203 | A * | 12/1993 | Batdorf | B05D 3/0254 264/510 |
| 5,571,570 | A * | 11/1996 | Lake | 427/494 |
| 5,654,083 | A * | 8/1997 | Venema | B32B 27/18 264/173.12 |
| 5,981,076 | A * | 11/1999 | Ojeda | B32B 27/18 428/421 |
| 6,376,064 | B1 * | 4/2002 | Gasworth | B05D 7/52 427/407.1 |
| 6,770,360 | B2 * | 8/2004 | Mientus et al. | 428/354 |
| 7,999,032 | B2 * | 8/2011 | Wada | B32B 27/18 428/327 |
| 2003/0003315 | A1 * | 1/2003 | Takahata | B32B 27/08 428/516 |
| 2003/0129410 | A1 * | 7/2003 | Mulcahy | B32B 27/36 428/412 |
| 2005/0095433 | A1 * | 5/2005 | Bogerd | C08K 3/38 428/411.1 |
| 2006/0051704 | A1 * | 3/2006 | Maekawa | B32B 3/30 430/270.1 |
| 2006/0078743 | A1 * | 4/2006 | Champlin | B32B 27/08 428/412 |
| 2006/0110549 | A1 * | 5/2006 | Wang | B32B 23/08 428/1.3 |
| 2006/0204746 | A1 * | 9/2006 | Li | B32B 7/02 428/332 |
| 2006/0234061 | A1 * | 10/2006 | Buckel | B32B 7/02 428/412 |
| 2006/0251996 | A1 * | 11/2006 | Bogerd | B32B 27/08 430/323 |
| 2007/0166562 | A1 * | 7/2007 | Swei | B32B 27/08 428/500 |
| 2007/0172636 | A1 * | 7/2007 | Smith | B32B 17/10018 428/195.1 |
| 2007/0212561 | A1 * | 9/2007 | Wada | B32B 27/08 428/522 |
| 2007/0224367 | A1 * | 9/2007 | Rudiger | B32B 27/18 428/1.1 |
| 2007/0237929 | A1 * | 10/2007 | Suga | B29C 45/14688 428/195.1 |
| 2008/0032101 | A1 * | 2/2008 | Reilly | B32B 27/08 428/213 |
| 2008/0095997 | A1 * | 4/2008 | Chiang et al. | 428/215 |
| 2008/0160298 | A1 * | 7/2008 | Li | B32B 7/12 428/337 |
| 2008/0198446 | A1 * | 8/2008 | Asakura | G02B 5/208 359/352 |
| 2009/0104447 | A1 * | 4/2009 | Kita et al. | 428/412 |
| 2009/0226730 | A1 * | 9/2009 | Hoess | B32B 27/18 428/424.4 |
| 2009/0257003 | A1 * | 10/2009 | Yoshihara | G02B 1/105 349/96 |
| 2009/0257707 | A1 * | 10/2009 | Shibata | H05K 1/0274 385/14 |
| 2009/0305012 | A1 * | 12/2009 | Song | B32B 7/02 428/212 |
| 2010/0220266 | A1 * | 9/2010 | Kashima | G02B 1/105 349/96 |
| 2010/0255293 | A1 * | 10/2010 | Toshiyuki | C08J 7/047 428/336 |
| 2010/0330362 | A1 * | 12/2010 | Matsumoto | C08G 77/448 428/337 |
| 2011/0073171 | A1 * | 3/2011 | Pickett | C08K 5/005 136/255 |
| 2011/0148050 | A1 * | 6/2011 | Vissing | B05D 1/62 277/650 |
| 2011/0171476 | A1 * | 7/2011 | Gruber | B29C 37/0025 428/421 |
| 2011/0223414 | A1 * | 9/2011 | Higuchi | B32B 27/08 428/334 |
| 2011/0232735 | A1 * | 9/2011 | Bizet | B32B 27/08 136/256 |
| 2011/0244185 | A1 * | 10/2011 | Dou | B29C 47/0021 428/156 |
| 2011/0249325 | A1 * | 10/2011 | Zehentmaier | B32B 7/02 359/359 |
| 2012/0019906 | A1 * | 1/2012 | Van Nuffel | B32B 27/18 359/359 |
| 2012/0063952 | A1 * | 3/2012 | Hong | H01L 31/049 422/24 |
| 2012/0099187 | A1 * | 4/2012 | Meyer Zu Berstenhorst | B32B 27/08 359/359 |
| 2012/0128961 | A1 * | 5/2012 | Yoshida | C08K 3/30 428/220 |
| 2012/0177929 | A1 * | 7/2012 | Meyer Zu Berstenhorst | B32B 27/18 428/412 |
| 2012/0243115 | A1 * | 9/2012 | Takamiya | B29D 11/0073 359/894 |
| 2013/0242381 | A1 * | 9/2013 | Pudleiner | B32B 27/08 359/359 |

FOREIGN PATENT DOCUMENTS

| | | |
|---|---|---|
| JP | 2001-232730 | 8/2001 |
| JP | 2001-246687 | 9/2001 |
| JP | 2002-154182 | 5/2002 |
| JP | 2002166502 A * | 6/2002 |
| JP | 2007-094072 | 4/2007 |
| JP | 2007152962 A * | 6/2007 |
| JP | 2008-233882 | 10/2008 |
| JP | 2010245112 A * | 10/2010 |
| TW | 201106005 | 2/2011 |
| WO | WO 9636478 A1 * | 11/1996 |
| WO | 2008/072765 | 6/2008 |
| WO | 2008/072766 | 6/2008 |
| WO | WO 2011032915 A1 * | 3/2011 |

OTHER PUBLICATIONS

"International Search Report (Form PCT/ISA/210)", mailed on Aug. 21, 2012, with English translation thereof, p. 1-p. 4, in which five of the listed references (JP2008-233882, JP2001-232730, JP2007-094072, JP2002-154182 and JP07-137210) were cited.
"Office Action of China Counterpart Application", issued on Dec. 14, 2015, pp. 1-9, with English translation thereof.
"Office Action of Taiwan Counterpart Application", issued on Nov. 26, 2015, pp. 1-10, with English translation thereof.
"2nd Office Action of China Counterpart Application", issued on Jun. 5, 2015, with English translation thereof, p. 1-p. 13, in which one of the listed reference (CN101365587A) was cited.

* cited by examiner

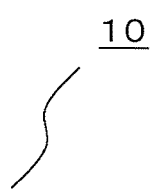
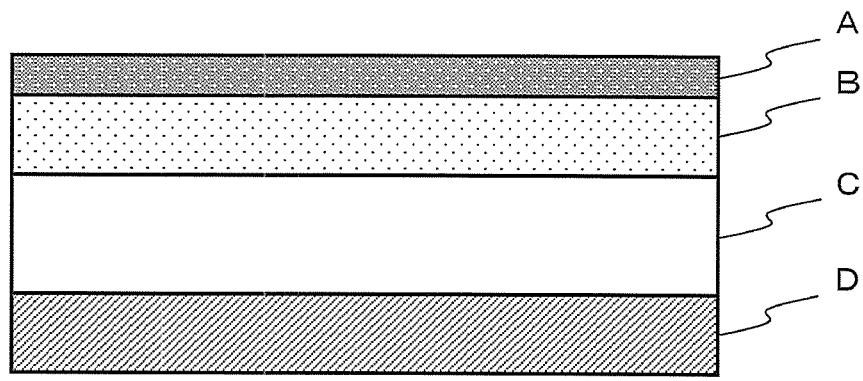

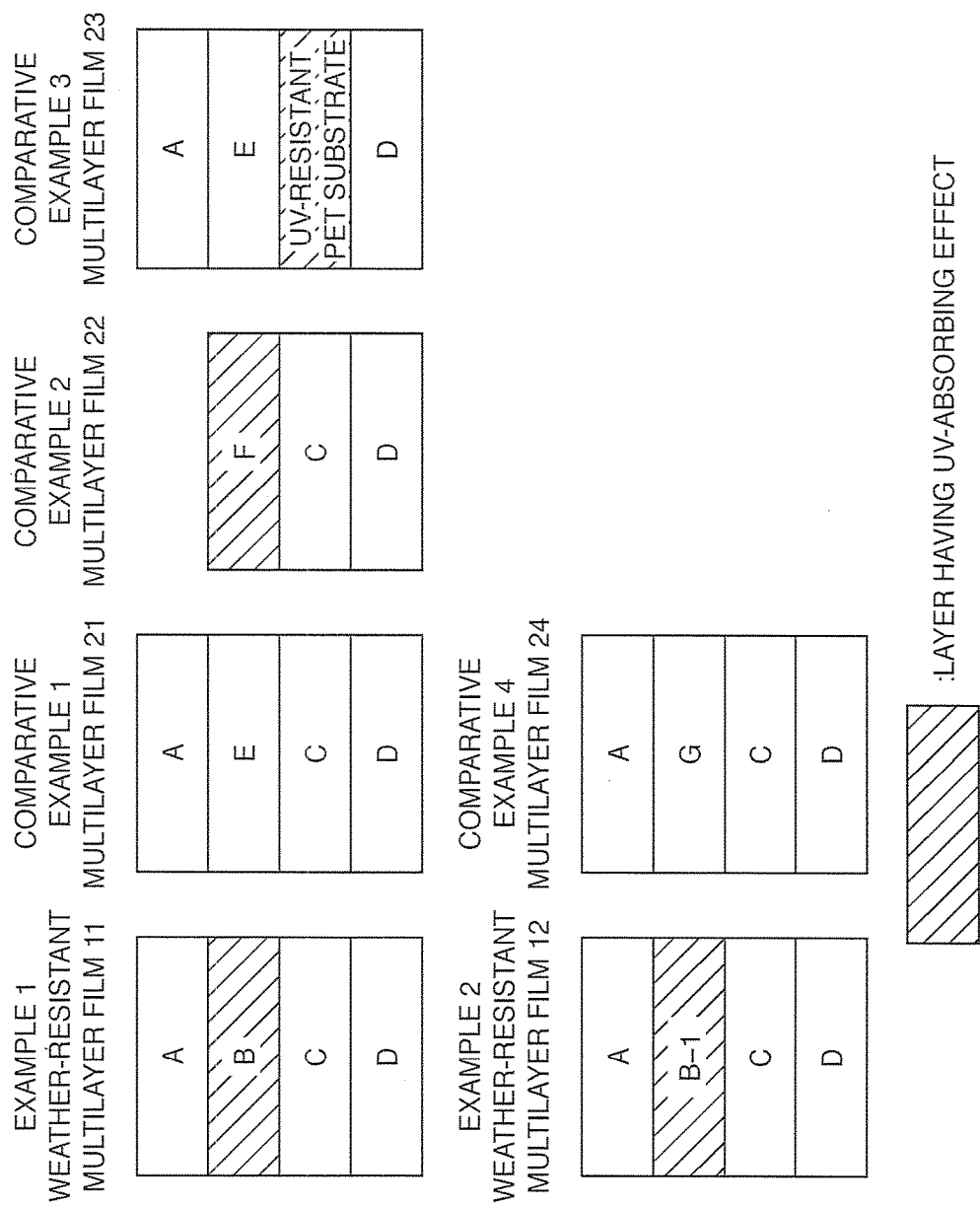

WEATHER-RESISTANT MULTILAYER FILM

CROSS-REFERENCE TO RELATED APPLICATION

This application is a 371 application of an international PCT application serial no. PCT/JP2012/066856, filed on Jul. 2, 2012, which claims the priority benefit of Japan application no. 2011-146758, filed on Jun. 30, 2011. The entirety of each of the above-mentioned patent applications is hereby incorporated by reference herein and made a part of this specification.

TECHNICAL FIELD

The present invention relates to a weather-resistant multilayer film, and, more particularly, to a multi-layered weather-resistant multilayer film.

BACKGROUND ART

On a surface of indicating elements (displays, cellular phones, etc.) for outdoor use, a weather-resistant film that does not deteriorate even when exposed to ultraviolet rays for a long period of time is attached.

A weather-resistant film produced by laminating a hard coat layer containing a UV absorber on a film-like resin (PET) has been developed.

As one example, there is a UV-absorbing layer that can be formed by applying a resin composition prepared by mixing a UV absorber into a resin to at least one side of a thermoplastic film in the form of an organic solvent solution or aqueous dispersion (Patent Document 1, paragraph 0011).

PRIOR ART DOCUMENT

Patent Document

Patent Document 1 JP-A-2001-246687

SUMMARY OF THE INVENTION

Problem to be Solved by the Invention

In many cases, however, the hard coat layer is composed of a UV-curable resin. Thus, when the UV-curable resin is cured, the ultraviolet rays are absorbed by the contained UV absorber, causing a problem of insufficient curing (uneven curing, etc.) of the resin. Another problem is a phenomenon in which the UV absorber oozes out to the surface of the hard coat layer with time (bleed-out), causing whitening of the film.

Yet another problem is the deterioration of the interface between the substrate and the hard coat layer by the effect of ultraviolet rays which causes a decrease in adhesion between the hard coat layer and the substrate. The yellowing of the PET as the substrate caused by the effect of the ultraviolet rays is also a problem.

It is, therefore, an object of the present invention to provide a multi-layered weather-resistant multilayer film which can avoid insufficient curing and suppress bleed-out, in which the adhesion of the layers to the substrate is sufficiently high, the risk of yellowing of the substrate reduces, and weather resistance is improved.

Means for Solving the Problem

The present inventors conducted earnest studies to solve the above problems, and consequently, found that the amount of UV absorber that is added can increase and bleed-out can be prevented when a weather-resistant multilayer film having the following configuration is used. The present inventors also found that the adhesion between the substrate and a layer laminated on the substrate can be maintained, and accomplished the present invention.

The constitution of the present invention is a weather-resistant multilayer film including a transparent film-like substrate; a UV-absorbing resin layer laminated on the substrate and containing a UV absorber; and a first cured resin layer laminated on the UV-absorbing resin layer, in which the first cured resin layer has a thickness of 1.0 to 10 μm; the UV-absorbing resin layer has a thickness of 0.5 to 5 μm; and the UV-absorbing resin layer has an absorption wavelength of 200 to 500 nm.

In other words, a weather-resistant multilayer film which can avoid insufficient curing of the first cured resin layer and suppress bleed-out of UV absorber from the UV-absorbing resin layer, in which the adhesion of the layers to the substrate is excellent, and which has improved weather resistance can be obtained by combining the UV-absorbing resin layer and the first cured resin layer.

A weather-resistant multilayer film according to the first aspect of the present invention comprises, as shown in FIG. 1, for example, a transparent film-like substrate C; a UV-absorbing resin layer B laminated on the substrate C and containing a UV absorber; and a first cured resin layer A laminated on the UV-absorbing resin layer B. The first cured resin layer A has a thickness of 1.0 to 10 μm. The UV-absorbing resin layer B has a thickness of 0.5 to 5 μm. The UV-absorbing resin layer B has an absorption wavelength of 200 to 500 nm.

With this configuration, the cured resin layer forming the outermost layer prevents bleed-out, a phenomenon in which the UV absorber oozes out to the surface of the film with time, and, consequently, the film is prevented from whitening. The more the UV absorber is added, the poorer compatibility with the resin the UV absorber has and the more likely the UV absorber is to ooze out to the surface. However, when an UV-absorbing resin layer and a cured resin layer are provided, the amount of UV absorber that can be added to the UV-absorbing resin layer increases.

When the amount of UV absorber is increased, the ability to absorb ultraviolet rays is improved. Thus, because the interface between the substrate and the layer laminated on the substrate can be prevented from deteriorating, the adhesion between the substrate and the layer laminated on the substrate is maintained. In addition, because exposure of the substrate to ultraviolet rays is reduced, the substrate can be prevented from yellowing and improve in weather resistance accordingly.

In addition, because the UV-absorbing resin layer and the first cured resin layer have the above thickness, the layers are not too thin to provide sufficient hardness and the entire thickness of the weather-resistant multilayer film cannot be too large. Further, because the UV-absorbing resin layer has an absorption wavelength of 200 to 500 nm, the weather-resistant multilayer film can effectively protect an article provided therewith from ultraviolet rays.

The weather-resistant multilayer film according to the second aspect of the present invention, in the weather-resistant multilayer film according to the first aspect of the invention, as shown in FIG. 1, for example, further comprises a second cured resin layer laminated on the side of the substrate opposite the UV-absorbing resin layer. The second cured resin layer has a surface free energy of 30 to 50 mN/m.

With this configuration, the second cured resin layer enables the weather-resistant multilayer film to undergo a treatment, such as mold decoration or sputtering of ITO. This makes it possible to use the weather-resistant multilayer film as an ITO sputtered film, icon sheet or three-dimensional decorative film, and to apply it to the housings of display devices and electric components for outdoor use and so on. In particular, by adjusting the surface free energy of the second cured resin layer to 30 to 50 mN/m, a film suitable for printing can be obtained.

As for the weather-resistant multilayer film according to the third aspect of the present invention, in the weather-resistant multilayer film according to the first or the second aspect of the invention, the first cured resin layer and/or the second cured resin layer contain a UV-curable resin.

The phrase "contain a UV-curable resin" means consisting essentially of a UV-curable resin, and is intended to limit the materials of the cured resin layer to a UV-curable resin and components that do not substantially affect the basic and novel features of the weather-resistant multilayer film according to the third aspect. More specifically, the first cured resin layer A and/or the second cured resin layer D may contain any components in addition to the UV-curable resin as long as the layers function as a protective layer.

With this configuration, because the outermost layer or the print layer of the weather-resistant multilayer film is composed of an UV-curable resin, the outermost layer or the print layer can maintain sufficient hardness to function fully as a protective layer.

As for the weather-resistant multilayer film according to the fourth aspect of the present invention, in the weather-resistant multilayer film according to any one of the first aspect to the third aspect of the invention, the UV-absorbing resin layer contains at least one resin selected from the group consisting of thermoplastic resins, thermosetting resins and active energy beam-curable resins and the resin has a weight-average molecular weight of 1,000 to 1,000,000.

The phrase "contains at least one resin selected from the group consisting of thermoplastic resins, thermosetting resins and active energy beam-curable resins" means consisting essentially of the resin, and is intended to limit the materials of the UV-absorbing resin layer to the resin and components that do not substantially affect the basic and novel features of the weather-resistant multilayer film according to the fourth aspect. More specifically, the UV-absorbing resin layer B may contain any components in addition to the resin as long as the resin fully functions as a layer.

With the weight-average molecular weight configuration, a film formed from the resin has sufficient hardness. In addition, because the resin can maintain the solubility to a solvent, a solution of the resin does not have too high a viscosity and is therefore easy to handle.

An image display device comprises: a weather-resistant multilayer film according to any one of the first aspect to the fourth aspect of the present invention; and an image panel having a screen on which the weather-resistant multilayer film is placed.

With this configuration, because a weather-resistant multilayer film having improved weather resistance is provided on the screen, the image panel has improved weather resistance.

Effect of the Invention

According to the present invention, a multi-layered weather-resistant multilayer film can be obtained which can avoid insufficient curing and suppress bleed-out, in which the adhesion of the layers to the substrate is sufficiently high, the risk of yellowing of the substrate reduces, and the weather resistance is improved.

BRIEF DESCRIPTION OF DRAWINGS

FIG. 1 is a diagram illustrating the layer configuration of a weather-resistant multilayer film.

FIG. 3 is a diagram illustrating the layer configuration of the films of Examples 1 and 2 and Comparative Examples 1 to 4.

BEST MODE FOR CARRYING OUT THE INVENTION

Figure 2:
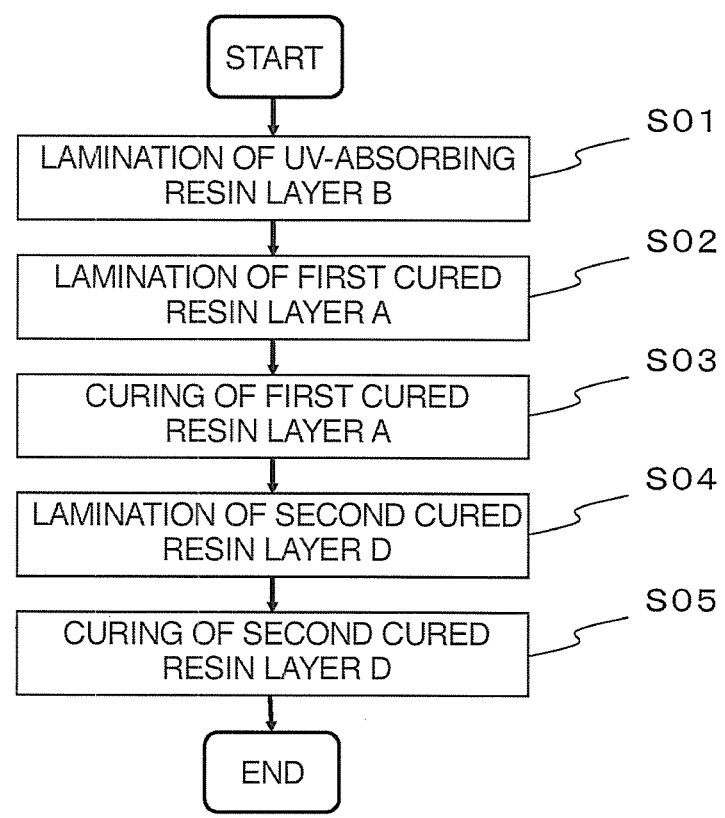
FIG. 2 is a diagram illustrating the flow of a method for the production of a weather-resistant multilayer film.

The present application is based on Japanese Patent Application No. 2011-146758 applied on Jun. 30, 2011 in Japan. The content forms part thereof as the content of the present application. The invention will be more completely understood by the detailed description provided hereinafter. Further areas of applicability of the invention will become more apparent from the detailed description provided hereinafter. However, it should be understood that the detailed description and specific examples indicate desired embodiments of the invention, and are provided for the purpose of illustration only because it will be apparent to those skilled in the art that various modifications and variations can be made without departing from the spirit or scope of the invention from the detailed description. Applicants have no intention to present any described embodiments to the public, and among modifications and variations, the subject matter that may not be fallen within the scope of claims should also be part of the invention under the doctrine of equivalents.

Hereinafter, the embodiments of the invention will be explained with reference to drawings. In addition, an identical or similar symbol is attached to a mutually identical part or a corresponding part in each drawing, and an overlapped explanation is omitted. Moreover, the invention is in no way limited to embodiments as described below.

[Weather-Resistant Multilayer Film]

Description is hereinafter made of a weather-resistant multilayer film 10 according to a first embodiment of the present invention with reference to FIG. 1. It should be noted that FIG. 1 is intended to illustrate the layer configuration of the weather-resistant multilayer film 10 having a multi-layer structure and the thickness of each layer is exaggerated in FIG. 1. The weather-resistant multilayer film 10 includes a film-like substrate C as a substrate, a UV-absorbing resin layer B and a first cured resin layer A (hard coat layer), and also has a second cured resin layer D on the side of the substrate C opposite the side on which the UV-absorbing resin layer B is laminated.

[Substrate C]

The substrate C functions as a support during the production of the weather-resistant multilayer film 10. Various types of plastic film can be used as the film-like polymer resin for the substrate C. Examples of the material of the plastic film include resins such as polyester resin, acetate resin, polyether sulfone resin, polycarbonate resin, polyamide resin, polyimide resin, polyolefin resin, (meth)acrylic resin, polyvinyl chloride resin, polyvinylidene chloride resin, polystyrene resin, polyvinyl alcohol resin, polyarylate resin, polyphenylene sulfide resin and cyclic polyolefin resin. Specifically, cyclic polyolefin resins, such as polyethylene terephthalate (PET), polyethylene naphthalate, triacetyl cellulose, polyether sulfone, polycarbonate, polyarylate, polyether ether ketone, Zeonor (registered trademark) and Zeonex (registered trademark): manufactured by Zeon Corporation, Arton (registered trademark): manufactured by JSR Corporation, Apel (registered trademark): manufactured by Mitsui Chemicals, Inc., and Topas (registered trademark): manufactured by Polyplastics Co., Ltd., are preferred. Polyethylene terephthalate (PET) and polyethylene naphthalate are more preferred because they are excellent in mechanical strength, dimensional stability, heat resistance, chemical resistance and optical characteristics and forms a film with high surface flatness and handleability. Polycarbonate is more preferred because of its excellent transparency, impact resistance, heat resistance, dimensional stability and flammability. Cyclic polyolefin resins are more preferable because they have excellent optical characteristics, such as high transparency and low birefringence, high heat resistance and low water absorbability. When price and availability are also taken into account, polyethylene terephthalate (PET) is particularly preferred.

The substrate C has a thickness of 2 to 250 μm, preferably 10 to 200 μm, especially preferably 20 to 190 μm. When the thickness of the substrate C is 2 μm or greater, the mechanical strength of the substrate is not so insufficient that the processes, such as film formation of the weather-resistant multilayer film 10, can be carried out easily. When the thickness is 250 μm or less, the weather-resistant multilayer film 10 is suitable for touch panels of cellular phones, tablet PCs, AOI.PC monitors, portable audios, electronic book readers, digital still cameras, digital video cameras, portable game machines, equipments for automobile use, portable navigation devices and digital signages, liquid crystal displays, plasma displays and so on, which are tending to be thinner.

[UV-Absorbing Resin Layer B]

The UV-absorbing resin layer B is a layer composed of at least one of a thermoplastic resin, a thermosetting resin and an active energy beam-curable resin (UV-curable resin, for example) and containing a UV absorber. The weather-resistant multilayer film 10 including the UV-absorbing resin layer B can prevent an article from deterioration caused by exposure to ultraviolet rays.

The term "active energy beam" as used herein means an energy beam which can decompose a compound that generates an active species to generate an active species. Examples of the active energy beam include energy beams such as visible light, ultraviolet rays, infrared rays, X-rays, α-rays, β-rays, γ-rays and electron beam.

Specific examples of the thermosetting resin or active energy beam-curable resin include resins having an unsaturated bond capable of radical polymerization such as (meth)acrylate monomer, unsaturated polyester resin, polyester (meth)acrylate resin, epoxy(meth)acrylate resin and urethane(meth)acrylate resin. These resins may be used singly or in combination of two or more.

Examples of the (meth)acrylate monomer include compounds obtained by reacting a polyhydric alcohol with an α,β-unsaturated carboxylic acid. Examples include polyalkylene glycol di(meth)acrylate, ethylene glycol (meth)acrylate, propylene glycol (meth)acrylate, polyethylene polytrimethylolpropane di(meth)acrylate, trimethylolpropane tri(meth)acrylate, trimethylolpropane ethoxy tri(meth)acrylate, trimethylolpropane diethoxy tri(meth)acrylate, trimethylolpropane triethoxy tri(meth)acrylate, trimethylolpropane tetraethoxy tri(meth)acrylate, trimethylolpropane pentaethoxy tri(meth)acrylate, tetramethylolmethane tetra(meth)acrylate, tetramethylolpropane tetra(meth)acrylate, pentaerythritol tri(meth)acrylate, pentaerythritol tetra(meth)acrylate, pentaerythritol penta(meth)acrylate, dipentaerythritol penta(meth)acrylate, dipentaerythritol hexa(meth)acrylate and (meth)acrylates having a cyclic structure. Specific examples of the (meth)acrylates having a cyclic structure include dicyclopentanyl (meth)acrylate, dicyclopentenyl (meth)acrylate, dicyclopentenyloxyethyl (meth)acrylate, isobornyl (meth)acrylate, tricyclodecane dimethanol di(meth)acrylate, mono- and di(meth)acrylate having a terpene skeleton, and photopolymerizable monomers such as (meth)acrylates modified either with ethylene glycol or propylene glycol.

Examples of the unsaturated polyester resin include resins prepared by dissolving a condensation product (unsaturated polyester) resulting from an esterification reaction between a polyhydric alcohol and an unsaturated polybasic acid (and optionally a saturated polybasic acid) in a polymerizable monomer.

The unsaturated polyester can be produced by polycondensation of an unsaturated acid, such as maleic anhydride, with a diol, such as ethylene glycol. Specific examples include reaction products of an acid component composed of a polybasic acid having a polymerizable unsaturated bond, such as fumaric acid, maleic acid or itaconic acid, or an anhydride thereof with an alcohol component composed of a polyhydric alcohol, such as ethylene glycol, propylene glycol, diethylene glycol, dipropylene glycol, 1,2-butanediol, 1,3-butanediol, 1,5-pentane diol, 1,6-hexane diol, 2-methyl-1,3-propanediol, 2,2-dimethyl-1,3-propanediol, cyclohexane-1,4-dimethanol, ethylene oxide adduct of bisphenol A or propylene oxide adduct of bisphenol A. When necessary, a polybasic acid having no polymerizable unsaturated bond, such as phthalic acid, isophthalic acid, terephthalic acid, tetrahydrophthalic acid, adipic acid or sebacic acid, or an anhydride thereof may be added as an acid component.

Examples of the polyester(meth)acrylate resin include (1) (meth)acrylate obtained by reacting a carboxyl-terminated polyester obtained from a saturated polybasic acid and/or an unsaturated polybasic acid and a polyhydric alcohol with an epoxy compound containing an α,β-unsaturated carboxylic acid ester group, (2) (meth)acrylate obtained by reacting a carboxyl-terminated polyester obtained from a saturated polybasic acid and/or an unsaturated polybasic acid and a polyhydric alcohol with a hydroxyl group-containing acrylate, and (3) (meth)acrylate obtained by reacting a hydroxyl-terminated polyester obtained from a saturated polybasic acid and/or an unsaturated polybasic acid and a polyhydric alcohol with a (meth)acrylic acid.

Examples of the saturated polybasic acid used as an ingredient of the polyester(meth)acrylate include polybasic acids having no polymerizable unsaturated bond, such as phthalic acid, isophthalic acid, terephthalic acid, tetrahydrophthalic acid, adipic acid and sebacic acid, and anhydrides thereof, and polymerizable unsaturated polybasic acid, such as fumaric acid, maleic acid and itaconic acid, and anhydrides thereof. Examples of the polyhydric alcohol component are the same as those for the unsaturated polyester.

Examples of the epoxy(meth)acrylate resin include resins prepared by dissolving a compound (vinyl ester) having a polymerizable unsaturated bond which is formed by a ring-opening reaction of a compound having a glycidyl group (epoxy group) with the carboxyl groups of a carboxyl compound having a polymerizable unsaturated bond, such as acrylic acid, in a polymerizable monomer.

The vinyl ester may be produced by a heretofore known method. Examples include epoxy(meth)acrylates obtained by reacting an epoxy resin with an unsaturated monobasic acid, such as acrylic acid or methacrylic acid.

Epoxy resins of various types may be reacted with a bisphenol (such as bisphenol A) or a dibasic acid, such as adipic acid, sebacic acid or dimer acid (Haridimer 270S: Harima Chemicals Group, Inc.), to impart flexibility to the resins.

Examples of the epoxy resin as an ingredient include bisphenol A diglycidyl ether and high-molecular weight homologues thereof, and novolak-type glycidyl ethers.

Examples of the urethane (meth)acrylate resin include a radical polymerizable unsaturated group-containing oligomer obtained by reacting a polyisocyanate with a polyhydroxy compound or polyhydric alcohols and then reacting the reaction product with a hydroxyl group-containing (meth)acryl compound and optionally a hydroxyl group-containing allyl ether compound.

Specific examples of the polyisocyanate include 2,4-tolylenediisocyanate and isomers thereof, diphenylmethane diisocyanate, hexamethylene diisocyanate, hydrogenated xylylene diisocyanate, isophorone diisocyanate, xylylene diisocyanate, dicyclohexylmethane diisocyanate, naphthaline diisocyanate, triphenylmethane triisocyanate, Burnock D-750 and Crisvon NK (trade names: manufactured by DIC Corporation), Desmodule L (trade name: manufactured by Sumitomo Bayer Urethane Co., Ltd.), Coronate L (trade name: manufactured by Nippon Polyurethane Industry Co., Ltd.), Takenate D102 (trade name: manufactured by Mitsui Takeda Chemicals Inc.) and Isonate 143L (trade name: manufactured by Mitsubishi Chemical Corporation).

Examples of the polyhydroxy compound include polyester polyol and polyether polyol, and specific examples thereof include glycerin-ethylene oxide adduct, glycerin-propylene oxide adduct, glycerin-tetrahydrofuran adduct, glycerin-ethylene oxide-propylene oxide adduct, trimethylolpropane-ethylene oxide adduct, trimethylolpropane-propylene oxide adduct, trimethylolpropane-tetrahydrofuran adduct, trimethylolpropane-ethylene oxide-propylene oxide adduct, dipentaerythritol-ethylene oxide adduct, dipentaerythritol-propylene oxide adduct, dipentaerythritol-tetrahydrofuran adduct and dipentaerythritol-ethylene oxide-propylene oxide adduct.

Specific examples of the polyhydric alcohols include ethylene glycol, diethylene glycol, triethylene glycol, polyethylene glycol, propylene glycol, dipropylene glycol, polypropylene glycol, 2-methyl-1,3-propanediol, 1,3-butanediol, adducts of bisphenol A with propylene oxide or ethylene oxide, 1,2,3,4-tetrahydroxybutane, glycerin, trimethylolpropane, 1,2-cyclohexane glycol, 1,3-cyclohexane glycol, 1,4-cyclohexane glycol, paraxylene glycol, bicyclohexyl-4,4-diol, 2,6-decalin glycol and 2,7-decalin glycol.

The hydroxyl group-containing (meth)acryl compound is not particularly limited and is preferably a hydroxyl group-containing (meth)acrylic acid ester. Specific examples include 2-hydroxyethyl (meth)acrylate, 2-hydroxypropyl (meth)acrylate, 3-hydroxybutyl (meth)acrylate, polyethylene glycol mono(meth)acrylate, polypropylene glycol mono (meth)acrylate, di(meth)acrylate of tris(hydroxyethyl)isocyanuric acid and pentaerythritol tri(meth)acrylate.

When an active energy beam-curable resin is used, a curing agent may be added as needed. In this case, the content of the curing agent is preferably 0.1 to 10% by weight, more preferably 0.1 to 5% by weight, especially preferably 0.1 to 4% by weight, based on the total amount of the active energy beam-curable resin composition. As a curing agent, an active energy beam polymerization initiator can be used. The active energy beam polymerization initiator is not specifically limited as long as it is a compound that generates a radical by irradiation of an active energy beam, such as ultraviolet rays or visible rays. Example of the compound that can be used as the active energy beam polymerization initiator include benzophenone, Michler's ketone, 4,4'-bis(diethylamino)benzophenone, xanthone, thioxanthone, isopropylxanthone, 2,4-diethylthioxanthone, 2-ethylanthraquinone, acetophenone, 2-hydroxy-2-methylpropiophenone, 2-hydroxy-2-methyl-4'-isopropylpropiophenone, 1-hydroxycyclohexyl phenyl ketone, isopropylbenzoin ether, isobutylbenzoin ether, 2,2-diethoxyacetophenone, 2,2-dimethoxy-2-phenylacetophenone, camphorquinone, benzanthrone, 2-methyl-1-[4-(methylthio)phenyl]-2-morpholinopropane-1-one, 2-benzyl-2-dimethylamino-1-(4-morpholinophenyl)-butanone, ethyl 1,4-dimethylaminobenzoate, isoamyl 4-dimethylaminobenzoate, 4,4'-di(t-butylperoxycarbonyl) benzophenone, 3,4,4'-tri(t-butylperoxycarbonyl) benzophenone, 2,4,6-trimethylbenzoyl diphenylphosphine oxide, 2-(4'-methoxystyryl)-4,6-bis(trichloromethyl)-s-triazine, 2-(3',4'-dimethoxystyryl)-4,6-bis(trichloromethyl)-s-triazine, 2-(2',4'-dimethoxystyryl)-4,6-bis(trichloromethyl)-s-triazine, 2-(2'-methoxystyryl)-4,6-bis(trichloromethyl)-s-triazine, 2-(4'-pentyloxystyryl)-4,6-bis(trichloromethyl)-s-triazine, 4-[p-N,N-di(ethoxycarbonylmethyl)]-2,6-di(trichloromethyl)-s-triazine, 1,3-bis(trichloromethyl)-5-(2'-chlorophenyl)-s-triazine, 1,3-bis(trichloromethyl)-5-(4'-methoxyphenyl)-s-triazine, 2-(p-dimethylaminostyryl) benzoxazole, 2-(p-dimethylaminostyryl)benzthiazol, 2-mercaptobenzothiazole, 3,3'-carbonylbis(7-diethylaminocoumarin), 2-(o-chlorophenyl)-4,4',5,5'-tetraphenyl-1,2'-biimidazole, 2,2'-bis(2-chlorophenyl)-4,4',5,5'-tetrakis(4-ethoxycarbonylphenyl)-1,2'-biimidazole, 2,2'-bis(2,4-dichlorophenyl)-4,4',5,5'-tetraphenyl-1,2'-biimidazole, 2,2'-bis(2,4-dibromophenyl)-4,4',5,5'-tetraphenyl-1,2'-biimidazole, 2,2'-bis(2,4,6-trichlorophenyl)-4,4',5,5'-tetraphenyl-1,2'-biimidazole, 3-(2-methyl-2-dimethylaminopropionyl)carbazole, 3,6-bis(2-methyl-2-morpholinopropionyl)-9-n-dodecylcarbazole, 1-hydroxycyclohexyl phenyl ketone, and bis($\eta^5$-2,4-cyclopentadiene-1-yl)-bis(2,6-difluoro-3-(1H-pyrrole-1-yl)-phenyl)titanium. These compounds may be used singly, and combined use of two or more of the compounds is also effective. Above all, 3,3',4,4'-tetra(t-butylperoxycarbonyl) benzophenone, 3,3',4,4'-tetra(t-hexylperoxycarbonyl)benzophenone, 3,3'-di(methoxycarbonyl)-4,4'-di(t-butylperoxycarbonyl)benzophenone, 3,4'-di(methoxycarbonyl)-4,3'-di(t-butylperoxycarbonyl)benzophenone, 4,4'-di(methoxycarbonyl)-3,3'-di(t-butylperoxycarbonyl) benzophenone and so are preferred.

As the thermosetting resin or active energy beam-curable resin, a curable resin, such as a resin containing an epoxy group, is preferred. Examples include resins that are cured by a carboxylic acid, amine, acid anhydride compound or acid-generating agent, preferably by a double salt, which is an onium salt that releases a Lewis acid, or a derivative thereof. These resins may be used singly or in combination of two or more.

Examples of the epoxy resin include epoxy resins produced from bisphenol A, bisphenol F, hydroquinone, resorcin, dihydroxynaphthalene, bis(4-hydroxyphenyl)methane, bis(4-hydroxyphenyl)dicyclopentane, 4,4'-dihydroxybenzophenone, bis(4-hydroxyphenyl)ether, bis(4-hydroxy-3-methylphenyl)ether, bis(3,5-dimethyl-4-hydroxyphenyl) ether, bis(4-hydroxyphenyl)sulfide, bis(4-hydroxy-3- methylphenyl)sulfide, bis(3,5-dimethyl-4-hydroxyphenyl) sulfide, bis(4-hydroxyphenyl)sulfone, bis(4-hydroxy-3-methylphenyl)sulfone, bis(3,5-dimethyl-4-hydroxyphenyl) sulfone, 1,1-bis(4-hydroxyphenyl)cyclohexane, 1,1-bis(4-hydroxy-3-methylphenyl)cyclohexane, 1,1-bis(3,5-dimethyl-4-hydroxyphenyl)cyclohexane, 4,4'-dihydroxybiphenyl-3,3',5,5'-tetramethylbiphenyl, bis (hydroxynaphthyl)methane, 1,1'-binaphthol and 1,1'-bis(3-t-butyl-6-methyl-4-hydroxyphenyl)butane.

In addition, examples of epoxy resins to be formed include phenol novolak-based epoxy resins, which are glycidyl-etherified products of a reaction product of phenols, such as phenol, o-cresol and catechol, with aldehydes such as formaldehyde;

polyglycidyl ethers of trityl skeleton-containing polyphenols obtained by condensation of phenols, such as phenol, cresol and methyl-t-butylphenol with aromatic aldehydes, such as hydroxybenzaldehyde;

polyglycidyl ethers of trityl skeleton-containing polyphenol-based novolaks, which are reaction products of trityl skeleton-containing polyphenols with formaldehydes;

polyglycidyl ethers of polyaralkylphenol resins, which are reaction products of phenols, such as phenol, o-cresol and catechol, with xylylene dichloride or (hydroxymethyl)benzene;

alicyclic hydrocarbon-containing polyphenol resin-type epoxy resins or polynaphthol resin-type epoxy resins, which are glycidyl ethers of reaction products of phenols, such as phenol, o-cresol and catechol, or naphthols, such as hydroxynaphthalene and dihydroxynaphthalene, with unsaturated alicyclic hydrocarbons, such as dicyclopentadiene and limonene;

polyglycidyl ethers of alicyclic hydrocarbon containing polyphenol novolak resins or polynaphthol novolak resins, which are reaction products of alicyclic hydrocarbon-containing polyphenol resins or polynaphthol resins with formaldehydes;

glycidyl ether compounds of polyhydric phenols obtained by a condensation reaction of phenols with aromatic carbonyl compounds;

polyglycidyl ethers of trihydric or higher phenols having as a fundamental skeleton fluoroglycine, tris(4-hydroxyphenyl)methane, 1,1,2,2-tetrakis(4-hydroxyphenyl)ethane, 1,3-bis[(4-hydroxyphenyl)methyl]benzene, 1,4-bis[(4-hydroxyphenyl)methyl]benzene or the like;

glycidyl ether compounds derived from cyclic phenols, such as calixarene;

amine-based epoxy resins derived from p-aminophenol, m-aminophenol, 4-aminometacresol, 6-aminometacresol, 4,4'-diaminodiphenylmethane, 3,3'-diaminodiphenylmethane, 4,4'-diaminodiphenyl ether, 3,4'-diaminodiphenyl ether, 1,4-bis(4-aminophenoxy)benzene, 1,4-bis(3-aminophenoxy)benzene, 1,3-bis(4-aminophenoxy)benzene, 1,3-bis(3-aminophenoxy)benzene, 2,2-bis(4-aminophenoxyphenyl) propane, p-phenylenediamine, m-phenylenediamine, 2,4-toluenediamine, 2,6-toluenediamine, p-xylylenediamine, m-xylylenediamine, 1,4-cyclohexanebis(methylamine), 1,3-cyclohexanebis(methylamine), N,N-diglycidylaniline or the like;

glycidyl ester-based compounds derived from aromatic carboxylic acids, such as p-oxybenzoic acid, m-oxybenzoic acid, terephthalic acid and isophthalic acid;

hydantoin-based epoxy compounds derived from 5,5-dimethylhydantoin or the like;

alicyclic epoxy resins, such as 2,2-bis(3,4-epoxycyclohexyl)propane, 2,2-bis[4-(2,3-epoxypropyl)cyclohexyl]propane, vinylcyclohexene dioxide, and 3,4-epoxycyclohexylmethyl-3,4-epoxycyclohexane carboxylate; and aliphatic epoxy resins obtained by oxidation of double bonds in unsaturated hydrocarbon compounds, such as polybutadiene.

The epoxy resin to be formed may be an alicyclic epoxy resin. Specific examples thereof include polyglycidyl ethers of polyhydric alcohols having at least one alicyclic ring, or epoxy resins obtained from a cyclohexane oxide or cyclopentene oxide-containing compound obtained by epoxidation of a cyclohexene or cyclopentene ring-containing compound with an oxidant.

Examples include epoxy resins, such as hydrogenated bisphenol A diglycidyl ether, 3,4-epoxycyclohexylmethyl-3,4-epoxycyclohexane carboxylate, 3,4-epoxy-1-methylcyclohexyl-3,4-epoxy-1-methylcyclohexane carboxylate, 6-methyl-3,4-epoxycyclohexylmethyl-6-methyl-3,4-epoxycyclohexane carboxylate, 3,4-epoxy-3-methylcyclohexylmethyl-3,4-epoxy-3-methylcyclohexane carboxylate, 3,4-epoxy-5-methylcyclohexylmethyl-3,4-epoxy-5-methylcyclohexane carboxylate, 2-(3,4-epoxycyclohexyl-5,5-spiro-3,4-epoxy)cyclohexane-metadioxane, bis(3,4-epoxycyclohexylmethyl)adipate, vinylcyclohexene dioxide, 4-vinylepoxycyclohexane, bis(3,4-epoxy-6-methylcyclohexylmethyl)adipate, 3,4-epoxy-6-methylcyclohexyl carboxylate, methylenebis(3,4-epoxycyclohexane), dicyclopentadiene diepoxide, ethylene glycol di(3,4-epoxycyclohexylmethyl)ether, ethylenebis(3,4-epoxycyclohexane carboxylate), dioctyl epoxyhexahydrophthalate, di-2-ethylhexyl-epoxyhexahydrophthalate, 1,2:8,9-diepoxylimonene (trade name: CEL3000, Daicel Chemical Industries, Ltd.), epoxidized 3-cyclohexene-1,2-dicarboxylic acid bis(3-cyclohexenyl methyl)-modified ε-caprolactone (trade name: Epolead GT301, Daicel Chemical Industries, Ltd.), epoxidized butanetetracarboxylic acid tetrakis-(3-cyclohexenylmethyl)-modified ε-caprolactone (trade name: Epolead GT401, Daicel Chemical Industries, Ltd.), 1,2-epoxy-4-(2-oxiranyl) cyclohexane adduct of 2,2-bis(hydroxymethyl)-1-butanol (trade name: EHPE3150, Daicel Chemical Industries, Ltd.), a mixture of 1,2-epoxy-4-(2-oxiranyl)cyclohexane adduct of 2,2-bis(hydroxymethyl)-1-butanol and 3,4-epoxycyclohexenyl methyl-3',4'-epoxycyclohexene carboxylate (trade name: EHPE3150CE, Daicel Chemical Industries, Ltd.), 3,4-epoxycyclohexylmethyl acrylate (trade name: Cyclomer A400, Daicel Chemical Industries, Ltd.), 3,4-epoxycyclohexylmethyl methacrylate (trade name: Cyclomer M100, Daicel Chemical Industries, Ltd.), epoxidized polybutadiene (trade name: Epolead PB3600, Daicel Chemical Industries, Ltd.), and an epoxidized thermoplastic elastomer (trade name: Epofriend, Daicel Chemical Industries, Ltd.).

Examples of the epoxy resin further include epoxy resins obtained from aliphatic polyhydric alcohols or polyglycidyl ethers of alkylene oxide adducts thereof; epoxy resins obtained from polyglycidyl esters of aliphatic long-chain polybasic acids; homopolymers synthesized by vinyl polymerization of glycidyl acrylate or glycidyl methacrylate; and copolymers synthesized by vinyl polymerization of glycidyl acrylate or glycidyl methacrylate with another vinyl monomer.

Specific examples of the polyglycidyl ether include glycidyl ethers of polyhydric alcohols, such as 1,4-butanediol diglycidyl ether, 1,6-hexanediol diglycidyl ether, triglycidyl ether of glycerin, triglycidyl ether of trimethylolpropane, tetraglycidyl ether of sorbitol, hexaglycidyl ether of dipentaerythritol, diglycidyl ether of polyethylene glycol, and diglycidyl ether of polypropylene glycol.

Specific examples of the polyglycidyl ester include polyglycidyl ethers of polyether polyols obtained by adding one or two or more kinds of alkylene oxides to aliphatic polyhydric alcohols, such as propylene glycol, trimethylolpropane and glycerin, and diglycidyl esters of aliphatic long-chain dibasic acids.

Examples of the epoxy resin further include epoxy resins obtained from monoglycidyl ethers of aliphatic higher alcohols, or phenol, cresol or butylphenol, or monoglycidyl ethers of polyether alcohols obtained by adding an alkylene oxide thereto; epoxy resins obtained from glycidyl esters of higher fatty acids; and epoxy resins obtained from epoxidized soybean oil, octyl epoxystearate, butyl epoxystearate, epoxidized linseed oil and epoxidized polybutadiene.

As described above, the polymer having a crosslinkable functional group for use in an embodiment of the present invention can be used in combination with a curing reaction initiator (such as an acid-generating agent) in addition to a monomer that forms a matrix resin (such as an epoxy resin).

There is no limitation to the curing reaction initiator as long as it is a compound which can release a substance that initiates cationic polymerization upon exposure to an active energy beam or thermal energy. Examples of the curing reaction initiator include carboxylic acids, amines, acid anhydride compounds and acid-generating agents, and double salts, which are onium salts that release a Lewis acid, or derivatives thereof are preferred.

Representative examples of the curing reaction initiator include salts of cations and anions represented by the following general formula:

$$[A]^{m+}[B]^{m-}$$

In the above formula, the cation $[A]^{m+}$ is preferably an onium ion represented by, for example, the formula below:

$$[(\alpha)_a Q]^{m+}$$

wherein α is an organic group which has 1 to 60 carbon atoms and may contain any number of atoms in addition to the carbon atoms; a is an integer of 1 to 5; the a-number of α's are independent from each other and may be the same or different; at least one α is preferably an organic group having an aromatic ring;

Q represents an atom or atomic group selected from the group consisting of S, N, Se, Te, P, As, Sb, Bi, O, I, Br, Cl, F and N≡N; and m=a−q (provided that N≡N is assumed to have a valence of 0), wherein q represents the valence of Q in the cation $[A]^{m+}$.

The anion $[B]^{m-}$ is preferably a halide complex represented by, for example, the formula below:

$$[LX_b]^{m-}$$

wherein L represents a metal or metalloid as a central atom of the halide complex, which is B, P, As, Sb, Fe, Sn, Bi, Al, Ca, In, Ti, Zn, Sc, V, Cr, Mn, Co or the like; X represents a halogen atom; b is an integer of 3 to 7; and m=b−p, wherein p represents the valence of L in the anion $[B]^{m-}$.

Specific examples of the anion $[LX_b]^{m-}$ represented by the above general formula include tetrafluoroborate ($BF_4$), hexafluorophosphate ($PF_6$), hexafluoroantimonate ($SbF_6$), hexafluoroarsenate ($AsF_6$) and hexachloroantimonate ($SbCl_6$).

An anion $[B]^{m-}$ represented by the formula below can be also preferably used. L, X and b are the same as those described above.

$$[LX_{b-1}(OH)]^{m-}$$

Examples of the anion $[B]^{m-}$ further include perchlorate ion ($ClO_4$)⁻, trifluoromethyl sulfite ion ($CF_3SO_3$)⁻, fluorosulfonate ion ($FSO_3$)⁻, toluenesulfonate anion, and trinitrobenzenesulfonate anion.

Of the onium salts, the curing reaction initiator for use in an embodiment of the present invention is preferably any one of aromatic onium salts as shown in the following (a) to (c). These salts may be used singly or in combination of two or more.

(a) Aryldiazonium salts such as phenyldiazonium hexafluorophosphate, 4-methoxyphenyldiazonium hexafluoroantimonate, and 4-methylphenyldiazonium hexafluorophosphate.

(b) Diaryliodonium salts such as diphenyliodonium hexafluoroantimonate, di(4-methylphenyl)iodonium hexafluorophosphate, and di(4-t-butylphenyl)iodonium hexafluorophosphate.

(c) triarylsulfonium salts such as triphenylsulfonium hexafluoroantimonate, tris(4-methoxyphenyl)sulfonium hexafluorophosphate, diphenyl-4-thiophenoxyphenylsulfonium hexafluoroantimonate, diphenyl-4-thiophenoxyphenylsulfonium hexafluorophosphate, 4,4'-bis(diphenylsulfonio)phenylsulfide-bis-hexafluoroantimonate, 4,4'-bis(diphenylsulfonio)phenylsulfide-bis-hexafluorophosphate, 4,4'-bis[di(β-hydroxyethoxy)phenylsulfonio]phenylsulfide-bis-hexafluoroantimonate, 4,4'-bis[di(β-hydroxyethoxy)phenylsulfonio]phenylsulfide-bis-hexafluorophosphate, 4-[4'-(benzoyl)phenylthio]phenyl-di-(4-fluorophenyl)sulfonium hexafluoroantimonate, and 4-[4'-(benzoyl)phenylthio]phenyl-di-(4-fluorophenyl)sulfonium hexafluorophosphate.

Further, the curing reaction initiator for use in an embodiment of the present invention may be a mixture of an iron-arene complex or aluminum complex with silanols, such as triphenylsilanol.

Examples of the iron-arene complex includes (η⁵-2,4-cyclopentadiene-1-yl)[(1,2,3,4,5,6-η)-(1-methylethyl)benzene]-iron-hexafluorop hosphate. Examples of the aluminum complex include tris(acetylacetonato)aluminum, tris(ethylacetonatoacetato)aluminum, and tris(salicylaldehydato)aluminum.

Above all, the curing reaction initiator for use in an embodiment of the present invention is preferably an aromatic iodonium salt, aromatic sulfonium salt or iron-arene complex from the viewpoint of usefulness.

The content of the curing reaction initiator (preferably, an acid-generating agent) is preferably 1 mol based on 10 to 300 mol of the epoxy group contained in the epoxy resin.

The active energy beam-curable resin can be cured by irradiation of ultraviolet rays (UV) or an electron beam from an active energy beam source.

A case where the active energy beam-curable resin is used upon UV irradiation is described as one example. The active energy beam-curable resin is preferably one that is cured by polymerization induced by ultraviolet irradiation in the presence of a photopolymerization initiator. Examples of the photopolymerization initiator include various types of benzoin derivatives, benzophenone derivatives, phenylketone derivatives, onium salt photoinitiators, organic metal photoinitiators, metal salt cationic photoinitiators, photodegradable organosilane, latent sulfonic acid and phosphine oxide. The photopolymerization initiator is preferably added in an amount of 1 to 5 parts by weight based on 100 parts by weight of the active energy beam-curable resin.

Examples of the thermoplastic resin include cyclic polyolefin resins such as polyester resin, acetate resin, polyether sulfone resin, polycarbonate resin, polyamide resin, polyimide resin, polyolefin resin, (meth)acrylic resin, polyvinyl chloride resin, polyvinylidene chloride resin, polystyrene resin, polyvinyl alcohol resin, polyarylate resin, polyphenylene sulfide resin, Zeonor (registered trademark) and Zeonex (registered trademark): manufactured by Zeon Corporation, Arton (registered trademark): manufactured by JSR Corporation, Apel (registered trademark): manufactured by Mitsui Chemicals, Inc., and Topas (registered trademark): manufactured by Polyplastics Co., Ltd. Specifically, polymethylmethacrylate, polystyrene, polyethylene terephthalate (PET), polyethylene naphthalate, triacetyl cellulose, polyether sulfone, polycarbonate, polyarylate, polyether ether ketone, cyclic polyolefin resins and so on are preferred. These resins may be used singly or in combination of two or more.

Examples of the thermosetting resin further include resins such as melamine resin, urethane resin, and epoxy resin. Specific examples of the melamine resin include alkylated melamine resins such as methylated melamine resin and butylated melamine resin, methylol-type melamine resin, and imino-type melamine resin. Examples of the urethane resin include polyether-type polyurethane resin, polyester-type polyurethane resin, polycarbonate-type polyurethane resin and polyester polycarbonate-type polyurethane resin. Examples of the epoxy resin include bisphenol A-type epoxy resin, glycidyl ester-type epoxy resin, alicyclic epoxy resin, polymers of a monomer having oxirane or copolymers of a monomer having oxirane with another monomer. These resins may be used singly or in combination of two or more.

The resin used in the UV-absorbing resin layer B preferably has a weight-average molecular weight of 1,000 to 1,000,000. When the weight-average molecular weight is 1,000 or more, the film formed from the resin has sufficient hardness. When the weight-average molecular weight is 1,000,000 or less, the resin has such a high solvent solubility that it forms a solution with moderate viscosity which can be handled easily. The weight-average molecular weight can be measured by GPC (Gel Permeation Chromatography) or the like.

Examples of the UV absorber include benzotriazoles, hydroxyphenyl triazines, benzophenones, salicylates, cyanoacrylates, triazines and dibenzoyl resorcinols. These UV absorbers may be used singly or in combination of two or more. The type or combination of UV absorbers is preferably selected as appropriate based on the wavelength of the ultraviolet rays to be absorbed.

The UV-absorbing resin layer B has a thickness of 0.5 to 5 μm, for example. The thickness may be changed as appropriate based on the UV-absorbing ability of the UV-absorbing resin layer B or the content of the UV absorber.

The weight ratio between the resin and the UV absorber contained in the UV-absorbing resin layer B is preferably 90:10 to 10:90. When the proportion of the UV absorber is 10% by weight or higher, the substrate can be easily prevented from yellowing or a decrease in adhesion. When the proportion is 90% by weight or lower, the UV-absorbing resin layer B can be easily formed as a layer (film).

The UV-absorbing resin layer B preferably has an absorption wavelength of 200 to 500 nm. When absorption of 400 nm or longer is required, the UV absorber used itself tends to be yellowish and the film containing the absorber itself tends to have a color. When the absorption wavelength exceeds 500 nm, the coloring cannot be neglected. When it comes to natural light, because ultraviolet rays with a wavelength of 200 nm or shorter usually do not reach the surface of the earth, there is no need to take into account the wavelengths in that range.

The UV-absorbing resin layer B is laminated by applying a coating liquid composed primarily of the resin containing the UV absorber on the substrate C, and drying the coated film by heating. The coating liquid may contain, in addition to the resin, various additives, such as antioxidant, light stabilizer, wax, silica, plasticizer, leveling agent, surfactant, dispersant and antifoaming agent, and a solvent as needed.

Examples of the antioxidant include monophenols (such as 2,6-di-t-butyl-p-cresol, butylated hydroxyanisole, 2,6-di-t-butyl-p-ethylphenol and stearyl-β-(3,5-di-t-butyl-4-hydroxyphenyl)propionate), bisphenols (such as 2,2'-methylenebis(4-methyl-6-t-butylphenol), 2,2'-methylenebis(4-ethyl-6-t-butylphenol), 4,4'-thiobis(3-methyl-6-t-butylphenol), 4,4'-butylidenebis (3-methyl-6-t-butylphenol) and 3,9-bis [1,1-dimethyl-2-{β-(3-t-butyl-4-hydroxy-5-methylphenyl)propionyloxy}ethyl]2,4,8,10-tetraoxaspiro[5,5]undecane), polymeric phenols (such as 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis-[methylene-3-(3',5'-di-t-butyl-4'-hydroxyphenyl) propionate]methane, bis [3,3'-bis-(4'-hydroxy-3'-t-butylphenyl)butyric acid]glycol ester, 1,3,5-tris(3',5'-di-t-butyl-4'-hydroxybenzyl)-s-triazine-2,4,6-(1H,3H,5H)trione and tocopherol), sulfur-based antioxidants (such as dilauryl-3,3'-thiodipropionate, dimyristyl-3,3'-thiodipropionate and distearyl-3,3'-thiodipropionate), phosphites (such as triphenyl phosphite, diphenylisodecyl phosphite, phenyldiisodecyl phosphite, tris(nonylphenyl)phosphite, diisodecyl pentaerythritol phosphite, tris(2,4-di-t-butylpheny)phosphite, cyclic neopentanetetraylbis(octadecyl)phosphite, cyclic neopentanetetraylbis(2,4-di-t-butylphenyl)phosphite, cyclic neopentanetetraylbis(2,4-di-t-butyl-4-methylphenyl)phosphite, and bis[2-t-butyl-6-methyl-4-{2-(octadecyloxycarbonyl)ethyl}phenyl]hydrogen phosphite) and oxaphosphaphenanthrene oxides (such as 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide and 10-decyloxy-9,10-dihydro-9-oxa-10-phosphaphenanthrene-10-oxide). While each of these antioxidants may be used singly, a combined use of phenol-based/sulfur-based antioxidants or phenol-based/phosphorus-based antioxidants is particularly preferred. As a commercially available phenol-based antioxidant, IRGANOX 1010 (trade name) and IRGAFOS 168 (trade name) manufactured by BASF may be used each singly or in combination.

Example of the light stabilizer (HALS) include TINUVIN (registered trademark) 5100 (neutral multi-purpose HALS), TINUVIN292 (compound name: bis(1,2,2,6,6-pentamethyl-4-piperidinyl)sebacate, methyl(1,2,2,6,6-pentamethyl-4-piperidinyl)sebacate), TINUVIN152 (compound name: 2,4-bis[N-butyl-N-(1-cyclohexyloxy-2,2,6,6-tetramethylpiperidine-4-yl)amino]-6-(2-hydroxyethylamine)-1,3,5-triazine), TINUVIN144 (compound name: bis(1,2,2,6,6-pentamethyl-4-piperidinyl)-[[3,5-bis(1,1-dimethylethyl)-4-hydroxyphenyl]methyl]butyl malonate), TINUVIN123 (compound name: decanedioic acid, a reaction product of bis(2,2,6,6-tetramethyl-1-(octyloxy)-4-piperidinyl)ester (in the presence of 1,1-dimethylethyl hydroperoxide and octane)), and TINUVIN111FDL (approximately 50% of TINUVIN622, compound name: (butanedioic acid polymer (in the presence of (4-hydroxy-2,2,6,6-tetramethylpiperidinyl-yl)ethanol) and approximately 50% of CHIMASSORB119, compound name: N—N'—N"—N'"-tetrakis(4,6-bis(butyl-(N-methyl-2,2,6,6-tetramethylpiperidine-4-yl)amino)triazine-2-yl)-4,7-diazadecane-1,10-diamine), or Adekastab LA series manufactured by Adeka Corporation including LA-52 ((5)-6116), LA-57 ((5)-5555), LA-62 ((5)-5711) and LA-67((5)-5755). The numbers in the brackets are their Chemical Substance Numbers.

The concentration of the resin component in the coating liquid can be selected appropriately, for example, by adjusting its viscosity to a level suitable for the laminating method, such as wet coating. The concentration is preferably in the range of 5 to 80% by weight, for example, more preferably 10 to 60% by weight. Examples of the solvent that can be used include methyl isobutyl ketone, methyl ethyl ketone, butyl acetate, ethyl acetate, toluene, xylene, butanol and ethylene glycol monoethylether acetate.

Because the resin is used as a coating liquid, a curable resin which is liquid before being cured is preferred.

A wet coating method, by which a coating liquid can be uniformly coated, is preferably used to laminate the UV-absorbing resin layer B. Examples of the wet coating method that can be used include gravure coating and die coating. Gravure coating is a process in which a gravure roll having an engraved surface is immersed into a coating liquid and then the coating liquid on the engraved surface of the gravure roll is scraped off with a doctor blade so that a precise amount of coating liquid can remain in the recesses and be transferred onto a substrate. A liquid with a low viscosity can be coated into a thin layer by gravure coating. Die coating is a process in which coating is made by extruding a liquid from a coating head called die under pressure. Die coating can provide high-accuracy coating. In addition, the coating liquid is less likely to undergo a change in concentration and so on due to drying because the liquid is not exposed to the ambient air during application. Other examples of the wet coating method include spin coating, bar coating, reverse coating, roll coating, slit coating, dipping, spray coating, kiss coating, reverse kiss coating, airknife coating, curtain coating and rod coating.

The lamination is carried out by a method selected from these methods as appropriate based on the desired film thickness. In addition, when a wet coating method is used, a large scale-production can be done with high production efficiency because coating liquid can be applied at a line speed of a few dozen meters per minute (such as approximately 20 m/min).

When a multilayer die coater is used, the production efficiency can be further improved. Specifically, a film on which a UV-absorbing resin layer and a cured resin layer are laminated can be produced in one coating step by using a vacuum multilayer die coater to apply a UV-absorbing resin layer and a first cured resin layer to a substrate simultaneously and irradiating the layers with energy such as heat or ultraviolet rays. Because a plurality of layers can be laminated in one coating step when a multilayer die coater is used, the production efficiency can be improved. In addition, because the UV-absorbing resin layer and the cured resin layer are applied simultaneously, the layers are mixed at the interface and the adhesion between the layers is improved.

[First Cured Resin Layer A]

The first cured resin layer A, which is a layer laminated on the UV-absorbing resin layer B and is a layer consisting of at least one layer, finals the outermost layer of the weather-resistant multilayer film 10 and functions as a surface protecting layer. The first cured resin layer A contains an active energy beam-curable resin as described in the description of the UV-absorbing resin layer B.

The first cured resin layer A preferably has a thickness of 1.0 to 10 µm. When the thickness is 1.0 µm or greater, the first cured resin layer A has a sufficient thickness as a hard coat layer and can maintain a hard coat property sufficiently. When the thickness is 10 µm or less, the coating fluid can be handled easily because there is no need to increase the solid content concentration of the coating fluid. In addition, the appearance of the film can be maintained in good condition, and the productivity can be improved.

The first cured resin layer A is laminated by applying a coating liquid composed primarily of the active energy beam-curable resin on the UV-absorbing resin layer B, heating and drying the coated film, and irradiating the coated film with an active energy beam.

A wet coating method, by which a coating liquid can be uniformly coated, is preferably used to laminate the first cured resin layer A.

To cure the active energy beam-curable resin, the layer is irradiated with UV with a wavelength of 200 to 400 nm from a UV lamp (such as a high-pressure mercury lamp, ultra-high-pressure mercury lamp, metal halide lamp, high-power metal halide lamp) for a short period of time (in the range of a few seconds to a few dozens of seconds). When curing by electron beam irradiation is employed, the layer is irradiated with a low-energy electron beam from a self-shielded low-energy electron accelerator with energy of 300 keV or lower.

The first cured resin layer A preferably has an anti-scratch property, a low-refractive index property, a high-refractive index property, an anti-glare property, an electrical conductivity property, an antibacterial property, an antifouling property, an abrasion-resistant property, a gas barrier property and a blue light-cutting property as needed according to the intended use.

As a method for imparting a scratch resistance property, at least one selected from the group consisting of metal oxides, such as aluminum oxide, silicon oxide, titanium oxide, tin oxide, zirconium oxide, magnesium fluoride, cerium oxide, copper oxide and zinc oxide, apatite, fluorite, iron oxide, antimony oxide, cryolite, calcite, gypsum and talc is preferably mixed in the first cured resin layer A.

As a method for imparting a low-refractive index property, at least one of the following is preferably mixed in the first cured resin layer A: fine particles of an inorganic substance, such as magnesium fluoride or silica, a compound selected from the group consisting of fluorosilsesquioxane, and fluorosilsesquioxane polymers disclosed in WO2008/072766 and WO2008/072765, and an acrylate compound containing a fluorine atom.

As a method for imparting a high-refractive index property, at least one of the following is preferably mixed in the first cured resin layer A: fine particles of a metal, such as zirconia, titania or zinc sulfide, acrylate compounds and epoxy compounds having a fluorene skeleton, and acrylate compounds and epoxy compounds containing a sulfur atom.

When a transparent electrode material, such as ITO or silver nanowires, is coated on the cured resin layer to which a high-refractive index property has been imparted and patterning is carried out by etching, the resulting laminate can be used as a transparent electrode film that can be incorporated in a capacitance type touch panel. The use of a cured resin layer to which a high-refractive index property has been imparted can make the conductive pattern on the transparent electrode material, such as ITO or silver nanowires, be less visible.

When a layer having the low-refractive index property is laminated on a cured resin layer to which a high-refractive index property has been imparted, a first cured resin layer having an anti-reflection property can be obtained.

As a method for imparting an anti-glare property, at least one kind of fine particles of a metal, such as silica, a resin, such as polymethylmethacrylate or polyurethane, or the like is preferably mixed in the first cured resin layer A. More preferably, the metal fine particles or resin fine particles have a particle size of 0.2 to 2 microns, and the content of the metal fine particles or resin fine particles in the first cured resin layer A is 1 to 20% by weight.

The particle size (median diameter) was measured with a laser diffraction/scattering particle size distribution analyzer LA-950V2 manufactured by Horiba, Ltd. Specifically, the measurement was made by a wet method using the analysis based on Fraunhofer Diffraction Theory and Mie Scattering Theory, and the diameter at which the particles can be divided into two equal amounts (volumetric basis) is defined as the median diameter. The measurement was made by a wet method using a solution in which the sample was dispersed prepared by adding a small amount (about an earpickful) of measurement sample to pure water and treating the mixture in an ultrasonic bath for 3 minutes. The concentration of the slurry at the time of measurement was adjusted such that the laser permeation rate was 80%.

As a method for imparting an electrical conductivity property, at least one of the following is preferably mixed in the first cured resin layer A: metallic conductive materials, such as silver and copper, carbon-based conductive materials, such as carbon nanofibers, carbon nanotubes, fullerene, graphite and graphene, and organic conductive materials, such as PEDOT-PSS.

As a method for imparting antibacterial property, at least one of the following is mixed in the first cured resin layer A: fine particles of silver-supported silica or calcium phosphate, cationic surfactants, such as dialkyldimethylammonium chloride, alkylbenzyldimethylammonium chloride and monoalkyltrimethylammonium chloride, anionic surfactants, such as alkylbenzene sulfonate and alkyl sulfuric acid ester salt, and non-ionic surfactants such as polyoxyethylene alkyl ether and polyoxyethylene alkylphenyl ether.

As a method for imparting an antifouling or low-friction property, at least one selected from the group consisting of silicone compounds, fluorine compounds, fluorosilsesquioxane and fluorosilsesquioxane polymers described in WO2008/072766 and WO2008/072765 is preferably mixed in the first cured resin layer A.

Examples of the silicone compounds include BYK-UV3500 and BYK-UV-3570 (which are manufactured by BYK Japan KK), TEGO Rad2100, 2200N, 2250, 2500, 2600 and 2700 (which are manufactured by Degussa), and X-22-2445, X-22-2455, X-22-2457, X-22-2458, X-22-2459, X-22-1602, X-22-1603, X-22-1615, X-22-1616, X-22-1618, X-22-1619, X-22-2404, X-22-2474, X-22-174DX, X-22-8201, X-22-2426, X-22-164A and X-22-164C (which are manufactured by Shin-Etsu Chemical Co., Ltd.).

Examples of the fluorine compound include Optool DAC, Optool DAC-HP, R-1110, R-1210, R-1240, R-1620, R-1820, R-2020, R-5210, R-5410, R-5610, R-5810, R-7210, R-7310, Megafac RS-75, Megafac RS-72-K, Megafac RS-76-E, Megafac RS-76-NS, Megafac RS-77, Megafac RS-903-3, Megafac RS-914-2 and Megafac RS-761-3 manufactured by Daikin Industries, Ltd.

As a method for imparting a gas barrier property, at least one of the following is preferably mixed in the first cured resin layer A: layered clays, such as graphene, and inorganic components, such as silica, alumina and porous glass.

As a method for imparting a blue light-cutting property, at least one of the following is preferably mixed in the first cured resin layer A: silver fine particles that absorbs visible light in the range of 380 nm to 500 nm, and the compounds disclosed in Japanese Patent No. 4948022. A cured resin layer to which a blue light-cutting property has been imparted can cut blue light (visible light from 380 nm to 500 nm) emitted from the backlight of LEDs considered as the cause of eyestrain.

In addition, additives, such as active energy beam sensitizer, polymerization inhibitor, wax, plasticizer, leveling agent, surfactant, dispersant, antifoaming agent, wettability improver, antistat and curing aid, can be mixed as needed.

[Second Cured Resin Layer D]

The second cured resin layer D is a layer laminated on the side of the substrate C opposite the UV-absorbing resin layer B, and functions as a printable layer on which decoration, ITO sputtering or the like can be made. The second cured resin layer D contains an active energy beam-curable resin as described in the description of the UV-absorbing resin layer B. The second cured resin layer D is formed by applying a coating liquid containing the curable resin to the lower side of the substrate C, and curing the obtained coated film.

Alternatively, the second cured resin layer D may be formed from a curable resin composed of an acrylic compound having at least one of a hydroxyl group, a carboxyl group, a polyethylene glycol chain and a polypropylene glycol chain. Examples include acrylic compounds having a hydroxyl group, such as pentaerythritol triacrylate, acrylic compounds having a carboxyl group, such as 2-methacryloyloxyethyl succinate, acrylic compounds having a polyethylene glycol chain, such as ethoxylated glycerin triacrylate, polyethylene glycol diacrylate, and polyethylene glycol dimethacrylate, and acrylic compounds having a polypropylene glycol chain, such as polypropylene glycol diacrylate and ethoxylated polypropylene glycol dimethacrylate.

The second cured resin layer D is formed to have a surface free energy of 30 to 50 mN/m by the effect of the functional group (or polymer chain) contained in the curable resin for the second cured resin layer D. When the surface free energy is 30 mN/m or higher, the water and oil repellency of the second cured resin layer D is not so high that ITO or inks can be easily printed on the surface thereof. A surface free energy of 50 mN/m or lower is preferred for film processing because the surface is not sticky.

The surface free energy of the second cured resin layer D may be adjusted by blending two or more acrylic compounds. In this case, the surface free energy can be adjusted to a desired value more easily. Alternatively, the surface free energy may be adjusted by adding a surfactant or the like to the second cured resin layer D.

The second cured resin layer D has a thickness of 0.5 to 5.0 μm, preferably 2.0 to 4.0 μm. When the thickness is 0.5 μm or greater, a decrease in durability or chemical resistance is unlikely to occur because a cross-linked structure is easily formed by the curable resin. On the other hand, when the thickness is 5.0 μm or less, the second cured resin layer D is not too thick, so that its transparency, such as total light transmittance, is not lowered.

The second cured resin layer D preferably has an anti-Newton ring property, an anti-scratch property, a low-refractive index property, a high-refractive index property, an electrical conductivity property, a gas barrier property, and a blue light-cutting property as needed according to the intended use.

As a method for imparting an anti-Newton ring property, at least one kind of fine particles of a metal, such as silica, or a resin, such as polymethylmethacrylate or polyurethane, is preferably mixed in the second cured resin layer D. More preferably, the metal fine particles or resin fine particles have a particle size of 0.1 to 2 microns, and is preferably added to the second cured resin layer D in an amount that does not affect the transparency of the cured resin layer, more preferably in such an amount that the cured resin layer has a haze of 1.5% or less.

As a method for imparting a scratch resistance property, at least one selected from the group consisting of metal oxides, such as aluminum oxide, silicon oxide, titanium oxide, tin oxide, zirconium oxide, magnesium fluoride, cerium oxide, copper oxide and zinc oxide, apatite, fluorite, iron oxide, antimony oxide, cryolite, calcite, gypsum and talc is preferably mixed in the second cured resin layer D.

As a method for imparting a low-refractive index property, at least one of the following is preferably mixed in the second cured resin layer D: fine particles of an inorganic substance, such as magnesium fluoride or silica, a compound selected from the group consisting of fluorosilsesquioxane and fluorosilsesquioxane polymers disclosed in WO2008/072766 and WO2008/072765, and an acrylate compound containing a fluorine atom.

As a method for imparting the high-refractive index property, at least one of the following is preferably mixed in the second cured resin layer D: fine particles of a metal, such as zirconia, titania or zinc sulfide, acrylate compounds and epoxy compounds having a fluorene skeleton, and acrylate compounds and epoxy compounds containing a sulfur atom.

When a transparent electrode material, such as ITO or silver nanowires, is coated on the cured resin layer to which a high-refractive index property has been imparted and patterning is carried out by etching, the resulting laminate can be used as a transparent electrode film that can be incorporated in a capacitance type touch panel. The use of a cured resin layer to which a high-refractive index property has been imparted can make the conductive pattern on the transparent electrode material, such as ITO or silver nanowires, be less visible.

When a layer having a low-refractive index property is laminated on a cured resin layer to which a high-refractive index property has been imparted, a second cured resin layer D having an anti-reflection property can be obtained.

As a method for imparting an electrical conductivity property, at least one of the following is preferably mixed in the second cured resin layer D: metallic conductive materials, such as silver and copper, carbon-based conductive materials, such as carbon nanofibers, carbon nanotubes, fullerene, graphite and graphene, and organic conductive materials, such as PEDOT-PSS.

As a method for imparting a gas barrier property, at least one of the following is preferably mixed in the second cured resin layer D: layered clays, such as graphene, and inorganic components, such as silica, alumina and porous glass.

As a method for imparting a blue light-cutting property, at least one of the following is preferably mixed in the second cured resin layer D: silver fine particles that absorbs visible light in the range of 380 nm to 500 nm, and the compounds disclosed in Japanese Patent No. 4948022. A cured resin layer to which a blue light-cutting property has been imparted can cut blue light (visible light from 380 nm to 500 nm) emitted from the backlight of LEDs considered as the cause of eyestrain.

The weather-resistant multilayer film 10 according to the first embodiment as described above improves the weather resistance of image display devices (displays, cellular phones, etc.) for outdoor use. In other words, the weather-resistant multilayer film 10 is placed on the screen of an image panel and constitutes a part of the image display device, and prevents the image display device from deterioration caused by exposure to ultraviolet rays for a long period of time.

[Method for Production of Weather-Resistant Multilayer Film]

One example of the method for the production of a weather-resistant multilayer film according to a second embodiment of the present invention is described with reference to FIG. 2. It should be noted that the method for the production of a weather-resistant multilayer film of the present invention is not limited to the following method. A case where the UV-absorbing resin layer B contains an active energy beam-curable resin is described as an example. First, a coating liquid for the UV-absorbing resin layer B is applied to one side of the substrate C by wet coating, and the coating liquid is heated and dried (S01). Then, a coating liquid for the first cured resin layer A is coated on the UV-absorbing resin layer B by wet coating, and the coating liquid is heated and dried (S02). Then, the first cured resin layer A is cured by irradiation of an active energy beam (S03). When the first cured resin layer A is cured, the UV-absorbing resin layer B is also cured. Then, a coating liquid for the second cured resin layer D is applied to the other side of the substrate C (the side opposite the UV-absorbing resin layer B/the first cured resin layer A) (S04). Then, the second cured resin layer D is cured by irradiation of an active energy beam (S05). Because the application of the coating liquids (lamination) is carried out by a wet coating method, the lamination can be achieved with high productivity at a line speed of a few dozen meters per minute (such as approximately 20 m/min). Because the UV-absorbing resin layer B can be cured to a certain degree by the heating and drying in step S01, the coating liquids are prevented from mixing during the coating in step S02. Steps S02 and S03 may be carried out after steps S04 and S05.

When the UV-absorbing resin layer B contains a thermosetting resin, the UV-absorbing resin layer B is cured by the heating and drying in step S01. When the UV-absorbing resin layer B contains a thermoplastic resin, the UV-absorbing resin layer B is formed by the heating and drying in step S01.

The weather-resistant multilayer film of this application includes at least one UV-absorbing resin layer, and a first cured resin layer A as an uppermost layer which functions as a hard coat layer. The uppermost first cured resin layer A may not contain a UV absorber. With this configuration, the layer containing a UV absorber (the UV-absorbing resin layer B) can be prevented from bleeding out, and therefore the weather-resistant multilayer film can be prevented from whitening. In addition, a larger amount of UV absorber can be added to the layer containing a UV absorber (the UV-absorbing resin layer B) than to those of conventional weather-resistant films. As a result, the ability to absorb ultraviolet rays is improved. Thus, because the interface between the substrate and the layer laminated on the substrate can be prevented from deteriorating, the adhesion between the substrate and the layer laminated on the substrate is maintained. In addition, because exposure of the substrate to ultraviolet rays is reduced, the substrate can be prevented from yellowing accordingly. As described above, the weather resistance of the weather-resistant multilayer film of this application is improved by forming a multilayer structure.

In addition, in the method for the production of a weather-resistant multilayer film, a layer containing a UV absorber (the UV-absorbing resin layer B) is separately provided. Thus, the layer laminated as the uppermost layer (the first cured resin layer A) does not suffer from insufficient curing when cured by irradiation of an active energy beam.

EXAMPLES

Example 1

<Preparation of Coating Agent a>

An acrylate (trade name: Unidic 17-824-9, manufactured by DIC Corporation, 40 g) and methyl isobutyl ketone (MIBK, 60 g) were stirred and mixed in a light-resistant plastic bottle. When the mixture was determined to have become a transparent solution, the solution was named coating agent a.

<Preparation of Coating Agent b>

A UV absorber (trade name: Tinuvin 400, manufactured by BASF, 0.7 g), an acrylic polymer solution (polymethylmethacrylate solution having a weight-average molecular weight of 500,000 (catalogue value), trade name: MA830-M50, manufactured by Mitsuwa Chemical Lab. Co., Ltd., 52.8 g), methyl ethyl ketone (MEK, 23.2 g) and toluene (23.2 g) were stirred and mixed in a light-resistant plastic bottle. When the mixture was determined to have become a transparent solution, the solution was named coating agent b.

<Preparation of Coating Agent d>

An acrylate (trade name: Unidic 17-824-9, manufactured by DIC Corporation, 20 g), a multifunctional acrylate (trade name: A-GLY-9E, manufactured by Shin-Nakamura Chemical Co., Ltd., 15 g), and MIBK (65 g) were stirred and mixed in a light-resistant plastic bottle. When the mixture was determined to have become a transparent solution, the solution was named coating agent d.

<Fabrication of Weather-Resistant Multilayer Film 11>

A weather-resistant multilayer film 11 was fabricated by forming a first cured resin layer A from the coating agent a, a UV-absorbing resin layer B from the coating agent b, and a second cured resin layer D from the coating agent d. The methods of forming the layers A, B and D are shown below.

<Formation of UV-Absorbing Resin Layer B>

A PET film was used as a substrate C. The PET film had a thickness of 188 μm. The coating agent b was applied to the PET film with a bar coater so as to form a film with a dry thickness of 2 μm. After the film was dried at 130° C. for 30 seconds, a UV-absorbing resin layer B containing an active energy beam-curable resin was formed. In other words, a UV-absorbing resin layer B/substrate C laminate was formed.

<Formation of First Cured Resin Layer A>

The coating agent a was applied to one side of the formed UV-absorbing resin layer B with a bar coater so as to form a film with a dry thickness of 5 μm, and dried at 130° C. for 30 seconds. Then, the coated film was photo-cured using a high-pressure mercury lamp under a light irradiation condition of 500 mJ/cm$^2$ to form a first cured resin layer A. In other words, a first cured resin layer A/UV-absorbing resin layer B/substrate C laminate was formed.

<Formation of Second Cured Resin Layer D>

The coating agent d was applied to the side of the PET film opposite the first cured resin layer A/the UV-absorbing resin layer B with a bar coater so as to form a film with a dry thickness of 5 μm, and dried at 80° C. for 1 minute. Then, the coated film was photo-cured using a high-pressure mercury lamp under a light irradiation condition of 500 mJ/cm$^2$ to form a second cured resin layer D. In other words, a weather-resistant multilayer film 11 having a first cured resin layer A/UV-absorbing resin layer B/substrate C/second cured resin layer D structure was fabricated. The surface free energy of the second cured resin layer D was calculated from the contact angles of water and diiodomethane measured at 20° C. with a contact angle meter (Drop Master manufactured by Kyowa Interface Science Co., Ltd.). As a result, the surface free energy was 45 mN/m.

Example 2

<Preparation of Coating Agent b-1>

A UV absorber (trade name: Tinuvin 400, manufactured by BASF, 0.3 g), an epoxy resin (trade name: Celloxide 3150CE, manufactured by Daicel Chemical Industries, Ltd., 26.7 g), Sanaid SI-60 (manufactured by Sanshin Chemical Industry Co., Ltd., 0.3 g) as a curing agent, methyl ethyl ketone (MEK, 35 g), and toluene (35 g) were stirred and mixed in a light-resistant plastic bottle. When the mixture was determined to have become a transparent solution, the solution was named coating agent b-1.

<Fabrication of Weather-Resistant Multilayer Film 12>

A weather-resistant multilayer film 12 was fabricated by forming a first cured resin layer A from the coating agent a described in Example 1, a UV-absorbing resin layer B-1 from the coating agent b-1, and a second cured resin layer D from the coating agent d. The methods of forming the layers A, B-1 and D are shown below.

<Formation of UV-Absorbing Resin Layer B-1>

A PET film was used as a substrate C. The PET film had a thickness of 188 μm. The coating agent b-1 was applied to the PET film with a bar coater so as to form a film with a dry thickness of 2 μm. After the film was dried at 150° C. for 30 seconds, a UV-absorbing resin layer B-1 containing a thermosetting resin was formed. In other words, a UV-absorbing resin layer B-1/substrate C laminate was formed.

<Formation of First Cured Resin Layer A>

The coating agent a was applied to one side of the formed UV-absorbing resin layer B-1 with a bar coater so as to form a film with a dry thickness of 5 μm, and dried at 130° C. for 30 seconds. Then, the coated film was photo-cured using a high-pressure mercury lamp under a light irradiation condition of 500 mJ/cm$^2$ to form a first cured resin layer A. In other words, a first cured resin layer A/UV-absorbing resin layer B-1/substrate C laminate was formed.

<Formation of Second Cured Resin Layer D>

The coating agent d was applied to the side of the PET film opposite the first cured resin layer A/the UV-absorbing resin layer B-1 with a bar coater so as to form a film with a dry thickness of 5 μm, and dried at 80° C. for 1 minute. Then, the coated film was photo-cured using a high-pressure mercury lamp under a light irradiation condition of 500 mJ/cm$^2$ to form a second cured resin layer D. In other words, a weather-resistant multilayer film 12 having a first cured resin layer A/UV-absorbing resin layer B-1/substrate C/second cured resin layer D structure was fabricated. The surface free energy of the second cured resin layer D was calculated from the contact angles of water and diiodomethane measured at 20° C. with a contact angle meter (Drop Master manufactured by Kyowa Interface Science Co., Ltd. As a result, the surface free energy was 45 mN/m.

Comparative Example 1

<Preparation of Coating Agent e>

A coating agent e was prepared by repeating the same procedure as used to prepare the coating agent b except that no UV absorber was added. In other words, an acrylic polymer solution (trade name: MA830-M50, manufactured by Mitsuwa Chemical Lab. Co., Ltd., 52.8 g), MEK (23.2 g) and toluene (23.2 g) were stirred and mixed in a light-resistant plastic bottle. When the mixture was determined to have become a transparent solution, the solution was named coating agent e.

<Fabrication of Multilayer Film 21>

A multilayer film 21 was fabricated by the same method as used to fabricate the weather-resistant multilayer film 11 except that the coating agent e was used instead of the coating agent b. In other words, a weather-resistant multilayer film 21 having a first cured resin layer A/resin layer E/substrate C/second cured resin layer D structure was fabricated.

Comparative Example 2

<Preparation of Coating Agent f>

An acrylate (trade name: Unidic 17-824-9, manufactured by DIC Corporation, 40.0 g), a UV absorber (trade name: Tinuvin 400, manufactured by BASF 4.4 g) and MIBK (69.3 g) were stirred and mixed in a light-resistant plastic bottle. When the mixture was determined to have become a transparent solution, the solution was named coating agent f.

<Fabrication of Multilayer Film 22>

A multilayer film 22 was fabricated by forming a cured resin layer F from the coating agent f and a second cured resin layer D from the coating agent d. The methods of forming the layers F and D are shown below.

<Formation of UV Absorber Addition Cured Resin Layer F>

A PET film was used as a substrate C. The PET film had a thickness of 188 µm. The coating agent f was applied to the PET film with a bar coater so as to form a film with a dry thickness of 5 µm, and dried at 80° C. for 1 minute. Then, the coated film was photo-cured using a high-pressure mercury lamp under a light irradiation condition of 500 mJ/cm$^2$ to form a cured resin layer F. In other words, a UV absorber addition cured resin layer F/substrate C laminate was formed.

<Fabrication of Cured Resin Layer D>

The coating agent d was applied to the side of the substrate C opposite the cured resin layer F with a bar coater so as to form a film with a dry thickness of 5 µm, and dried at 80° C. for 1 minute. Then, the coated film was photo-cured using a high-pressure mercury lamp under a light irradiation condition of 500 mJ/cm$^2$ to form a second cured resin layer D as a print layer. In other words, a multilayer film 22 having a cured resin layer F/substrate C/second cured resin layer D structure was fabricated.

Comparative Example 3

<Fabrication of Multilayer Film 23>

A multilayer film 23 was fabricated by the same method as used to fabricate the multilayer film 21 except that a PET substrate that had been subjected to an anti-UV treatment (manufactured by Toyobo Co., Ltd., thickness: 100 µm) was used. In other words, a multilayer film 23 having a first cured resin layer A/resin layer E/UV-resistant PET substrate/second cured resin layer D structure was fabricated.

Comparative Example 4

<Preparation of Coating Agent g>

A coating agent g was prepared by repeating the same procedure as used to prepare the coating agent b-1 except that no UV absorber was added. In other words, an epoxy resin (trade name: Celloxide 3150CE, manufactured by Daicel Chemical Industries, Ltd., 27.7 g), Sanaid SI-60 (manufactured by Sanshin Chemical Industry Co., Ltd., 0.3 g) as a curing agent, methyl ethyl ketone (MEK, 35 g), and toluene (35 g) were stirred and mixed in a light-resistant plastic bottle. When the mixture was determined to have become a transparent solution, the solution was named coating agent g.

<Fabrication of Multilayer Film 24>

A multilayer film 24 was fabricated by the same method as used to fabricate the weather-resistant multilayer film 12 except that the coating agent g was used instead of the coating agent b-1. In other words, a weather-resistant multilayer film 24 having a first cured resin layer A/resin layer G/substrate C/second cured resin layer D structure was fabricated.

[Weather Resistance Test]

A weather resistance test was conducted on the weather-resistant multilayer film 11, the weather-resistant multilayer film 12, the multilayer film 21, the multilayer film 22, the multilayer film 23 and the multilayer film 24 under the following conditions.

One cycle (8 hr): UV irradiation (4 hr)+Storage in dark place (4 hr)

UV irradiation: UV-A 340 nm, 0.63 W/m$^2$/nm, 60° C., 4 hr

Dark place: moisture-resistant, 50° C., 4 hr

Number of cycles: 12

[Evaluation of Film]

FIG. 3 shows the layer configuration of the films of Examples 1 and 2 and Comparative Examples 1 to 4.

An adhesion test was conducted on the films of Examples 1 and 2 and Comparative Examples 1 to 4, and the color, total light transmittance, haze and gloss of the films were measured. Table 1 shows the results of the weather-resistant multilayer film 11 (Example 1), which had a system containing a UV absorber. Table 2 shows the results of the multilayer film 21 (Comparative Example 1), which had a system containing no UV absorber. Table 3 shows the results of the multilayer film 22 (Comparative Example 2), which had a hard coat layer containing a UV absorber and thus had weather resistance. Table 4 shows the results of the multilayer film 23 (Comparative Example 3), which was produced using a UV-resistant PET and thus had weather resistance. Table 5 shows the results of the weather-resistant multilayer film 12 (Example 2), which had a system containing a UV absorber. Table 6 shows the results of the multilayer film 24 (Comparative Example 4), which had a system containing no UV absorber.

TABLE 1

Evaluation result of weather-resistant multilayer film 11 (Example 1)

|  | Substrate adhesion | | | Total light | |
| --- | --- | --- | --- | --- | --- |
|  | Layers A and B | Layer D | Color b* | transmittance (%) | Haze (%) |
| 0 cycle | 100/100 | 100/100 | 0.71 | 91.7 | 0.5 |
| 12 cycles | 100/100 | 100/100 | 0.85 | 91.7 | 0.6 |

As shown above, the weather-resistant multilayer film 11 had almost the same values of adhesion, color, total light transmittance, haze and gloss before and after the weather resistance test.

TABLE 2

Evaluation result of multilayer film 21 (Comparative Example 1)

| | Substrate adhesion | | | Total light | |
| --- | --- | --- | --- | --- | --- |
| | Layers A and E | Layer D | Color b* | transmittance (%) | Haze (%) |
| 0 cycle | 100/100 | 100/100 | 0.87 | 91.5 | 0.5 |
| 12 cycles | 0/100 | 0/100 | 1.19 | 91.3 | 0.6 |

TABLE 3

Evaluation result of multilayer film 22 (Comparative Example 2)

| | Substrate adhesion | | | Total light | |
| --- | --- | --- | --- | --- | --- |
| | UV absorber + cured resin layer | Layer D | Color b* | transmittance (%) | Haze (%) |
| 0 cycle | 100/100 | 100/100 | 0.86 | 91.4 | 0.6 |
| 12 cycles | 100/100 | 100/100 | 0.96 | — | 9.8 |

TABLE 4

Evaluation result of multilayer film 23 (Comparative Example 3)

| | Substrate adhesion | | | Total light | |
| --- | --- | --- | --- | --- | --- |
| | Layers A and E | Layer D | Color b* | transmittance (%) | Haze (%) |
| 0 cycle | 100/100 | 100/100 | 0.86 | 91.4 | 0.6 |
| 12 cycles | 0/100 | 100/100 | 0.96 | 91.3 | 0.6 |

TABLE 5

Evaluation result of weather-resistant multilayer film 12 (Example 2)

| | Substrate adhesion | | | Total light | |
| --- | --- | --- | --- | --- | --- |
| | Layers A and B-1 | Layer D | Color b* | transmittance (%) | Haze (%) |
| 0 cycle | 100/100 | 100/100 | 0.66 | 91.8 | 0.5 |
| 12 cycles | 100/100 | 100/100 | 0.71 | 91.8 | 0.5 |

As shown above, the weather-resistant multilayer film 12 had almost the same values of adhesion, color, total light transmittance, haze and gloss before and after the weather resistance test.

TABLE 6

Evaluation result of multilayer film 24 (Comparative Example 4)

| | Substrate adhesion | | | Total light | |
| --- | --- | --- | --- | --- | --- |
| | Layers A and G | Layer D | Color b* | transmittance (%) | Haze (%) |
| 0 cycle | 100/100 | 100/100 | 0.64 | 91.8 | 0.5 |
| 12 cycles | 0/100 | 0/100 | 0.71 | 91.2 | 0.9 |

As shown above, the adhesion was not maintained and the degree of increase in the b* value was large in the multilayer film 21 after the weather resistance test. In the multilayer film 22, the adhesion between the UV absorber-containing cured resin layer (hard coat) and the substrate was maintained but an increase in haze caused by bleed-out was observed after the weather resistance test. In the multilayer film 23, the degree of increase in the b* value was not significant but the adhesion between the layers A and E (hard coat) and the substrate was not maintained after the weather resistance test. In the multilayer film 24, the degree of increase in the b* value was not significant but the adhesion between the layers A and G (hard coat) and the substrate was not maintained after the weather resistance test. These results suggest that when the UV-absorbing resin layers B or B-1 is provided on the PET substrate C, the adhesion between the PET and the UV-absorbing resin layers B or B-1 is maintained and the film can be prevented from yellowing or bleed-out.

Use of the terms "a," "an," "the" and similar referents used in the context in explanation of the invention (particularly in the context of claims as described below) is to be construed to cover both the singular form and the plural form, unless otherwise indicated herein or clearly contradicted by context. The terms "comprising," "having," "including" and "containing" are to be construed as open-ended terms (more specifically, meaning "including, but not limited to") unless otherwise noted. Recitation of ranges of values herein are merely intended to serve as a shorthand method of referring individually to each separate value falling within the range, unless otherwise indicated herein, and each separate value is incorporated herein as if it were individually recited herein. All methods described herein can be performed in any suitable order unless otherwise indicated herein or otherwise clearly contradicted by context. The use of any and all examples, or exemplary language ("such as") provided herein, is intended merely to better illuminate the invention and does not pose a limitation on the scope of the invention unless otherwise claimed. No language herein should be construed as indicating any non-claimed element as essential to the practice of the invention.

Preferred embodiments of the invention are described herein, including the best mode known to the present inventors for carrying out the invention. Variations of the preferred embodiments may become apparent to those skilled in the art upon reading the foregoing description. The present inventors expect skilled artisans to employ such variations as appropriate, and the present inventors intend for the invention to be practiced otherwise than as specifically described herein. Accordingly, the invention includes all modifications and equivalents of the subject matter recited in the claims appended hereto as permitted by applicable law. Moreover, any combination of the elements in all possible variations thereof is encompassed by the invention unless otherwise indicated herein or otherwise clearly contradicted by context.

DESCRIPTION OF REFERENCE NUMERALS AND SYMBOLS

A First cured resin layer, Hard coat layer
B, B-1 UV-absorbing resin layer
C Substrate C
D Second cured resin layer, Hard coat layer (Printable layer)
E Resin layer
F Cured resin layer
G Resin layer
a, b, b-1, d, e, f, g, coating agent
10, 11, 12 Weather-resistant multilayer film
21, 22, 23, 24 Multilayer film

What is claimed is:

1. A weather-resistant multilayer film, comprising:
a transparent film-like substrate;
a UV-absorbing resin layer laminated on the substrate and containing an organic UV absorber n a proportion of 10 to 90 wt %, wherein the organic UV absorber is at least one selected from the group consisting of benzotriazoles, hydroxyphenyl triazines, benzophenones, salicylates, cyanoacrylates, triazines and dibenzoyl risorcinols;
a first cured resin layer laminated on the UV-absorbing resin layer, wherein the first cured resin layer does not contain an organic UV absorber; and
a second cured resin layer laminated on a side of the substrate opposite the UV-absorbing resin layer,
wherein the first cured resin layer has a thickness of 1.0 to 10 μm,
the UV-absorbing resin layer has a thickness of 0.5 to 5 μm,
the UV-absorbing resin layer has an absorption wavelength of 200 to 500 nm,
the first cured resin layer contains a UV-curable resin,
the transparent film-like substrate comprises polyethylene terephthalate (PET), and
the second cured resin layer has a surface free energy of 30 to 45 mN/m.

2. The weather-resistant multilayer film according to claim 1,
wherein the second cured resin layer contains a UV-curable resin.

3. The weather-resistant multilayer film according to claim 1,
wherein the UV-absorbing resin layer contains at least one resin selected from a group consisting of thermoplastic resins, thermosetting resins and active energy beam-curable resins, and
the resin has a weight-average molecular weight of 1,000 to 1,000,000.

4. The weather-resistant multilayer film according to claim 1, wherein the UV-absorbing resin layer contains an active energy beam-curable resin having a weight-average molecular weight of 1,000 to 1,000,000.

5. An image display device, comprising:
a weather-resistant multilayer film according to claim 1; and
an image panel having a screen on which the weather-resistant multilayer film is placed.

* * * * *